United States Patent [19]

Williams

[11] Patent Number: 5,657,971
[45] Date of Patent: Aug. 19, 1997

[54] ABUTMENT PLATE WORKPIECE CLAMPING APPARATUS

[76] Inventor: Willis Ray Williams, 767 S. Fielder, Arlington, Tex. 76013

[21] Appl. No.: 514,207

[22] Filed: Aug. 11, 1995

[51] Int. Cl.⁶ .................................................. B23Q 3/00
[52] U.S. Cl. ........................ 269/16; 269/231; 269/303; 269/900
[58] Field of Search .................... 269/329, 319, 269/900, 16, 229, 231, 303, 305, 315

[56] References Cited

U.S. PATENT DOCUMENTS

| | | | |
|---|---|---|---|
| 1,016,594 | 2/1912 | Woodman | 269/231 |
| 3,608,886 | 9/1971 | Greene | 269/305 |
| 4,157,819 | 6/1979 | Meyer | 269/231 |
| 4,275,983 | 6/1981 | Bergman | 269/329 |
| 4,696,461 | 9/1987 | Zelinski | 269/16 |

FOREIGN PATENT DOCUMENTS 1231204  5/1971  United Kingdom.

*Primary Examiner*—Robert C. Watson
*Assistant Examiner*—Thomas W. Lynch
*Attorney, Agent, or Firm*—Henderson & Sturm

[57] ABSTRACT

A workpiece clamping apparatus for securing a workpiece relative to a planar support surface; wherein, the workpiece clamping apparatus includes an abutment plate having means for selectively positioning the abutment plate relative to the planar support surface; and, securing means operatively associated with the planar support surface for captively engaging the workpiece between the abutment plate and the securing means.

7 Claims, 1 Drawing Sheet

ABUTMENT PLATE WORKPIECE CLAMPING APPARATUS

TECHNICAL FIELD

The present invention relates to clamping arrangements in general and in particular to a workpiece clamping apparatus for securing a workpiece to a planar support surface.

BACKGROUND ART

Up until the present time, both professional and amateur craftsmen have been frustrated by the failure of the industry to provide an economically priced worktable that offers both a stable work surface and/or platform that is specifically designed to accommodate a wide variety of power tools, clamps and accessories to allow the draftsmen to perform a variety of tasks on different workpieces.

With the impending introduction of the subject matter of co-pending patent application Ser. No. 08/245,286 filed May 16, 1994, and entitled Collapsible Workbench Apparatus, a part of the solution to the above stated problem will be in place.

This particular invention involves a new style, collapsible workbench whose work surface employs a novel combination of channel tracks and spaced apertures that not only lend themselves to the mounting of existing power tools but which have also spawned an entire family of workpiece clamping apparatus that can be employed both alone and in combination with one another to immobilize a workpiece relative to the newly designed work surface.

DISCLOSURE OF THE INVENTION

An object of the present invention is to provide a workpiece clamping apparatus that will securely position a workpiece relative to a planar support surface.

Another object of the present invention is to provide a workpiece clamping apparatus that can be accommodated on any work support surface provided with rows of apertures and/or a plurality of channel tracks to fixedly secure a workpiece relative to the work support surface.

A further object of the present invention is to provide a workpiece clamping apparatus that can be used either alone or in combination with other related workpiece clamping apparatus to secure various workpieces in a variety of different orientations, both relative to a work support surface and/or the different workpiece clamping apparatus.

Still another object of the present invention is to provide a family of workpiece clamping apparatus components that can be combined with other related components in a variety of ways to produce different clamping configurations.

Yet another object of the present invention is to provide a workpiece clamping apparatus that is economically priced, rugged in construction, simple to use, either by itself or in combination with other clamping arrangements, and which has a long useful life.

BEST MODE FOR CARRYING OUT INVENTION

Figure 1:
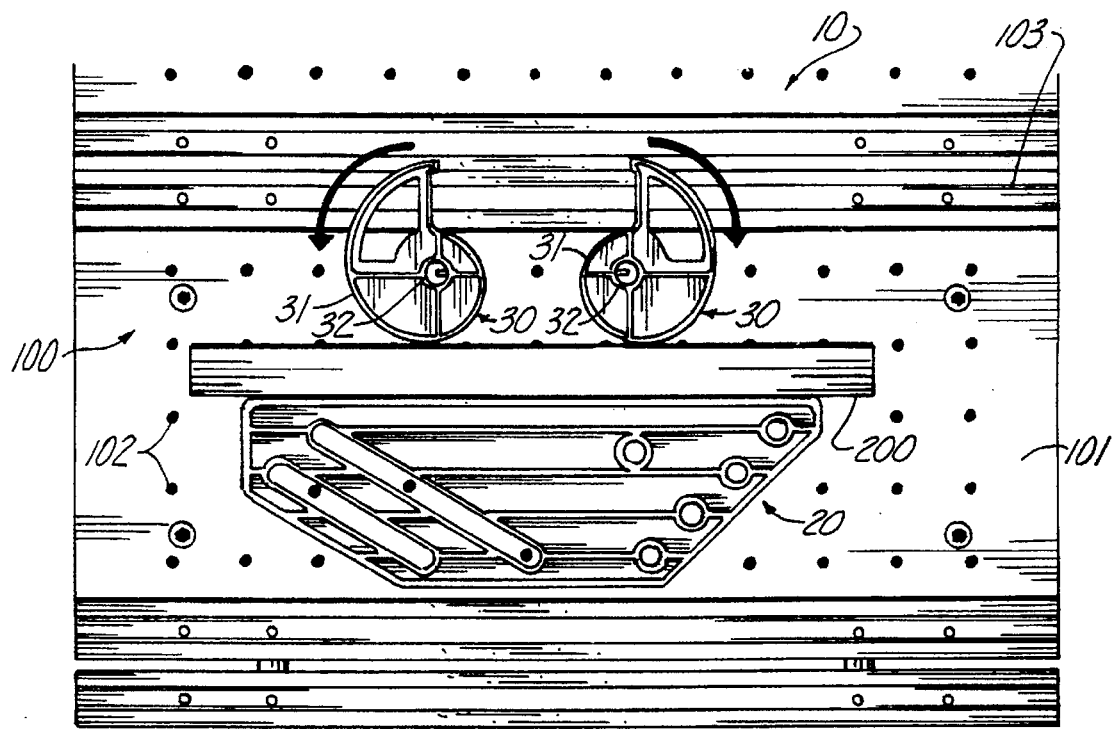
FIG. 1 is a top plan view of the abutment plate member that forms the basis of the present invention.

The best mode for carrying out the invention can best be seen by reference to the drawings in particular to FIG. 1, the work piece clamping apparatus that forms the basis of the present invention is designated generally by the reference numeral 10. The work piece clamping apparatus comprises, in general, an abutment plate member 20 and a plurality of cam members 30 disposed on top of a planar support member designated generally as 100 having a rigid support surface 101 provided with a plurality of spaced apertures 102 arranged in rows on the top surface of the rigid work surface, wherein the rigid work support surface 100 is further provided with a plurality of channel elements 103 whose purpose and function will be described in greater detail further on in the specification.

Figure 2:
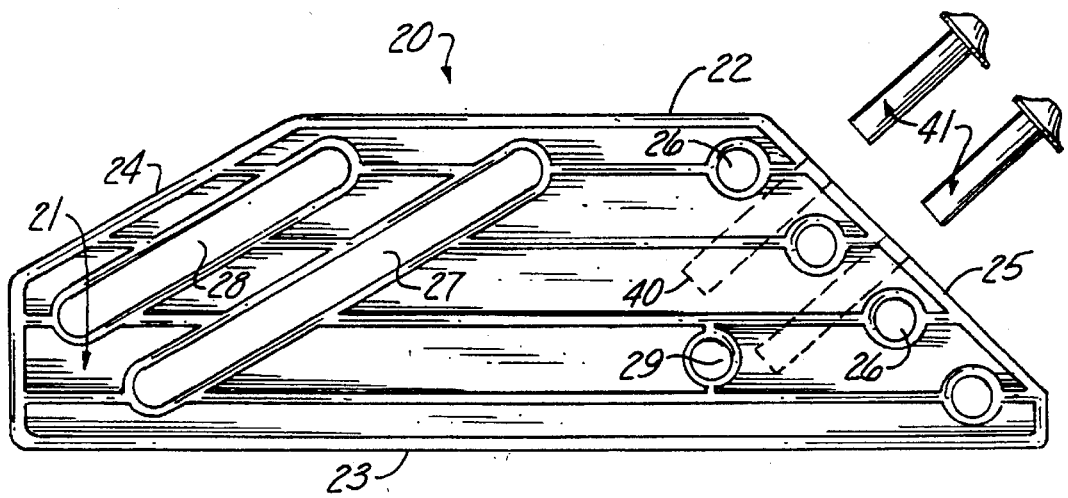
FIG. 2 is a top plan view of the abutment plate number employed in conjunction with other clamping apparatus for securing a work piece on a planar support surface.

As can be seen in reference to FIG. 2 the abutment plate member 20 comprises a rigid abutment plate 21 having a pair of opposed parallel sidewalls 22 and 23 and two angled sidewalls 24 and 25. In addition, the abutment plate 21 is further provided with a plurality of apertures 26 disposed adjacent one of the angled sidewalls 25, a plurality of elongated slots 27 and 28 disposed in a parallel relationship to one another and the sidewall 24 and a single aperture 29 which is spaced from the plurality of spaced apertures 26 and whose purpose and function will be likewise described in greater detail further on.

Still referring to FIG. 2 it can be seen that the abutment plate 21 is provided with a plurality of recesses 40 depicted in dashed lines wherein the recesses 40 are dimensioned to receive securing members 41. The securing members 41 are dimensioned to be received both in the plurality of apertures 26 and the elongated slots 27 and 28 and the abutment plate 21 and further to be received in the apertures 102 on the work support surface 101.

Turning now to the preferred embodiment depicted in FIG. 1 it can be seen that a work piece 200 may be selectively positioned on the planar work support surface 100 in the following manner: the abutment plate is positioned upon the work support surface 101 and one of the securing members 41 is selectively positioned or disposed in a selected one of the apertures 26 and the other securing member 41 is selectively positioned in one of the elongated slots 27 or 28 to align the abutment plate 21 at a desired angular orientation with respect to the planar support surface 100. Once the abutment plate has been disposed at the desired angular orientation, the work piece 200 is brought into contact with one of the flat, parallel sidewalls 22 or 23 of the abutment plate 21. Whereupon the locking cams 30 which comprise an arcuate cam element 31 mounted on a pin member 32, wherein the pin member is dimensioned to be received in selected ones of the plurality of apertures 102 on the planar work surface are positioned within the apertures such that the locking cam members 30 may be brought into frictional engagement with the opposite side of the work piece 200 to frictionally engage the work piece in a fixed location relative to the planar work surface.

By selectively choosing the apertures 102 and the particular slots 27 or 28 and the plurality of apertures 26 and remote aperture 29 which receive the securing members to dispose the abutment plate 21 on the planar work surface 100, the final position of the work piece 200 may be varied to suit the user's desires and goals.

It should further be noted that given the fact that securing members 41 are relatively discrete items, that the provision of the recesses 40 within the abutment plate 21 provides a safe and secure storage receptacle to prevent the loss of the securing elements 41.

Having hereby described the subject matter of the present invention it should be apparent that many substitutions, modifications, and variations are possible in light of the above teachings. It is therefore to be understood that the invention as taught and described herein is only to be limited to the extent of the breadth and scope of the appended claims.

I claim:

1. A workpiece clamping apparatus for securing a workpiece relative to a planar support surface having a plurality of apertures arranged in a pattern; wherein, the workpiece clamping apparatus comprises:

an abutment plate having a pair of angled sidewalls and at least one pair of parallel opposed sidewalls, a plurality of apertures disposed adjacent to one angled sidewall and at least one elongated slot disposed adjacent to the other angled sidewall; and, securing means dimensioned to be received in a selected aperture and said at least one slot in said abutment plate and selected apertures in said planar support surface, whereby said abutment plate may be captively rotated 360° relative to said selected aperture in the abutment plate; and, the abutment plate may be fixedly secured relative to said planar support surface at a variety of angles relative to said selected aperture in the abutment plate.

2. The workpiece clamping apparatus as in claim 1; wherein, said pair of parallel opposed sidewalls have different lengths.

3. The workpiece clamping apparatus as in claim 1; wherein, said abutment plate further includes:

a second pair of parallel opposed sidewalls.

4. The workpiece clamping apparatus as in claim 3; wherein, said second pair of parallel opposed sidewalls have different lengths.

5. The workpiece clamping apparatus as in claim 1; wherein, said abutment plate is provided with storage means dimensioned to receive said securing means.

6. The workpiece clamping apparatus as in claim 1; wherein, said other angled sidewall is provided with a pair of elongated recesses.

7. The workpiece clamping apparatus as in claim 6; wherein, said pair of elongated recesses are disposed parallel to one another.

* * * * *